United States Patent

[11] 3,590,959

| [72] | Inventor | Matthew E. Ferketich |
| | | Southampton, Pa. |
| [21] | Appl. No. | 844,081 |
| [22] | Filed | July 23, 1969 |
| [45] | Patented | July 6, 1971 |
| [73] | Assignee | Robinson Steel Company |
| | | Philadelphia, Pa. |

[54] BUMPER FOR AUTOMOBILE PARKING LOTS
1 Claim, 3 Drawing Figs.

[52] U.S. Cl.................................................. 188/32
[51] Int. Cl.................................................. B60t 3/00
[50] Field of Search.................................... 188/32; 94/31

[56] References Cited
UNITED STATES PATENTS
2,725,958  12/1955  Porter et al.................. 188/32
3,133,642  12/1963  Lay.............................. 188/32
3,280,943  10/1966  Luiz............................. 188/32
FOREIGN PATENTS
610,513  10/1960  Italy............................ 188/32

*Primary Examiner*—George E. A. Halvosa
*Attorney*—Paul & Paul

ABSTRACT: A bumper for parking lots comprises two body members for engaging the front wheels of a car being parked, connected by rod members. Each body member has a substantially flat forwardly presenting face disposed at an angle to the horizontal and supported by a depending web extending from the rear face along a longitudinal line between the upper and lower surfaces. The body can have two faces and two webs the webs being joined at the center and a plurality of holes being provided at the junction to accommodate pins to fix the bumper in position on the parking lot.

PATENTED JUL 6 1971

3,590,959

INVENTOR
MATTHEW E. FERKETICH

BY

PAUL & PAUL

ATTORNEYS

BUMPER FOR AUTOMOBILE PARKING LOTS

BACKGROUND OF THE INVENTION

This invention relates generally to automobile and truck bumpers of the kind used in commercial parking lots.

In the prior art automobile parking lots accommodating many automobiles utilized a variety of materials and designs in providing a means for spacing automobiles from one another and from the fences surrounding such lots. Concrete members having pins to hold them in place were used, as well as, railroad ties and extruded road surfacing. These materials tended to disintegrate with time and were easily moved from the place in which they were first affixed, in response to the heavy jolts which they received from automobile tires.

SUMMARY OF THE INVENTION

Present invention overcomes the deficiencies of the prior art by providing a steel bumper of novel construction which reacts to impact forces in a positive way to further secure the device in its original position. The bumper comprises a plurality of body members ridged interconnected by rod means to form a unitary structure. Each of the body members presents a flat surface to the oncoming wheel of an automobile, the surfaces of the body member being preferably coplanar and disposed at an angle to the horizontal, with the lead edge of the body member being in contact with the parking lot surface upon which it is mounted. Each of the body members has a rearwardly extending web supporting the front surface, angled toward the ground. Holes are provided in the web to accommodate pins for mounting the bumper in an initial fixed position on the lot.

In an alternate embodiment of my invention drain holes are provided along the bottom edges of the tire-engaging surfaces to allow for drainage of water running along the lot.

Accordingly, it is an object of this invention to provide a better parking lot bumper of the type which is utilized for engaging the wheels of an oncoming automobile being parked, which bumper is so constructed that it will withstand repeated impact without destruction thereof and will tend to remain in place rather than being shifted upon impact.

This and other objects of my invention will become apparent from the following description with reference to the accompanying drawings.

DESCRIPTION OF THE PREFERRED EMBODIMENTS

Figure 1:
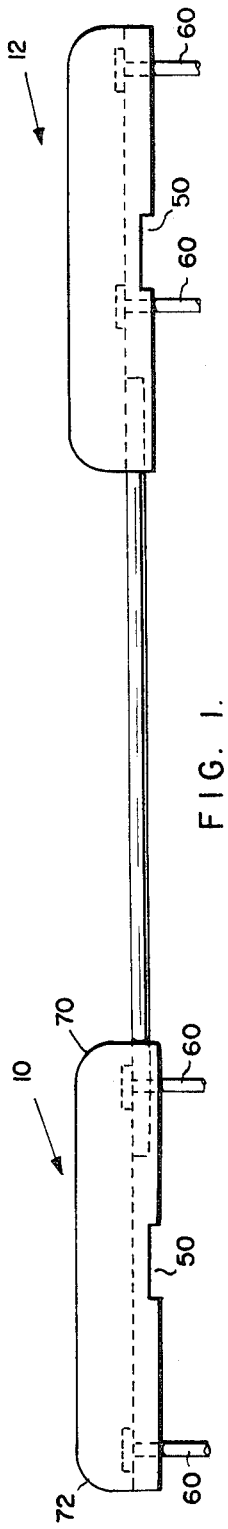
FIG. 1 is a front elevation of a bumper embodying my invention.
Figure 2:
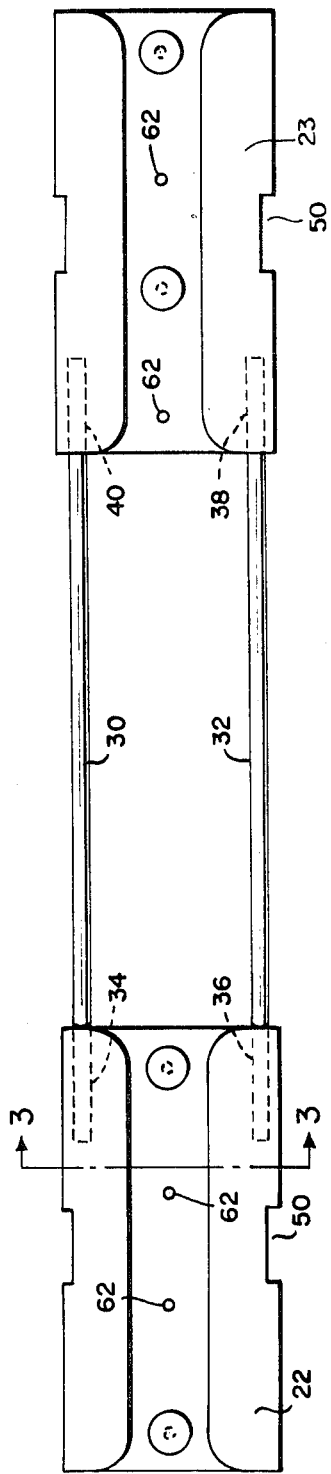
FIG. 2 is a top view of the bumper shown in FIG. 1.

Although specific forms of the invention have been selected for illustration in the drawings, and the following description is drawn in specific terms for the purpose of describing these forms of the invention, this description is not intended to limit the scope of the invention which is defined in the appended claims.

Figure 3:
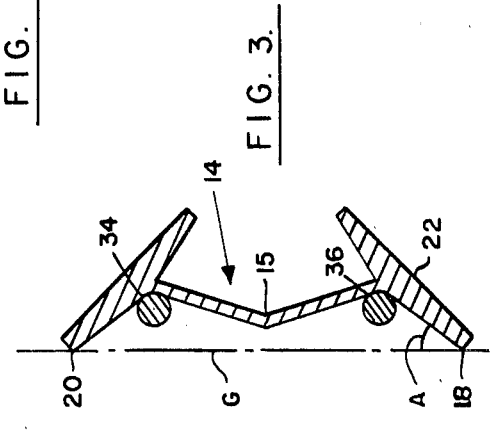
FIG. 3 is a section taken as indicated by the lines and arrows 3-3 in FIG. 2.

While the necessary structure required to practice my invention is set forth above in the Summary of the Invention, I prefer to describe hereinafter a means for practicing the invention which will be found most convenient by the trade. In accordance with the embodiment shown in the figures the body members designated generally 10 and 12 are identical and each consists of a short length (on the order of 30 inches) of structure steel of the type used in the construction industry. This structural steel member is preferably an I-beam having two flanges connected by a web. As shown in FIG. 3, the web designated generally 14 is creased longitudinally approximately in the center thereof as at 15. In this embodiment the crease is such that the bent portion at 15 does not extend to the plane containing the bottom edges 18 and 20 which rest upon the ground or lot surface G. Rather there is a clearance on the order of 1.5 inches. The forwardly presenting front face 22 is disposed at an angle A to the horizontal mounting surface or ground shown by the phantom line designated G.

The body members 10 and 12 are connected by steel rods 30 and 32 of the type used in the construction industry which are welded at the junction between the web member 14 and the end flanges, as at 34, 36, 38 and 40. The rods used were five-eighths of an inch in diameter and spaced the body members 2 feet 9 inches apart. Of course, a larger spacing can be provided and heavier rods can be used when making bumpers for parking lots for parking trucks. The rods are attached to the body members when the flat faces 22 and 23 are coplanar.

The bumpers are initially placed on the ground in the lot and are held in place by means of pins approximately 18 inches long which are driven through the plurality of clearance holes 62 provided in the crease 15 in the web 14 to make spacing of the pins convenient to the terrains. The pins have caps and are preferably serrated so as to grip the bumper and hold it securely in the ground. In the embodiment shown four such pins are provided for each body member to give a great deal of stability to the unit in actual use.

Where drainage is a problem the body members are provided with drainage holes along the lower edge of the faces as indicated at 50.

The upper corners of each face which will engage a tire are preferably rounded along a 2 3-inch radius to prevent the material from cutting the tires. In a typical example the face is 3¾ to 5¾ inches high and 21 inches long. The web is approximately 6 to 7 inches. The height of the clearance of the crease in the web from the ground can vary from 1½ to ½ inches. The pins used were 1⅛ inch in diameter and 18 inches long.

The rods being welded at the juncture previously referred to are spaced above the ground and therefore are less subject to corrosion and have the further advantage of permitting drainage. The structure shown has been found to be highly successful in that the tire engages the front face at or above the web, thus absorbing the force in a direction toward the ground, that is the structure tends to be wedged between the tire and the ground rather then exerting an excessive force transversed to the pins. The clearance space provided between the crease in the web and the ground provides a structure which absorbs impact well, that is, it tends to flex under the weight of the tires and automobile. Thus the device is particularly useful in that it tends to remain in place rather than being shifted with constant pounding normal to bumpers in use in commercial or business parking lots.

The body members shown are spaced apart at a convenient distance for the average automobile, but of course could be lengthened or shortened or spaced differently within the scope of this invention. It is convenient to have these members spaced apart as shown by the lightweight rods since these rods are inexpensive and useful in drainage purposes as aforesaid. Further the plurality of rods provides for a torque or load transmission means between one body and the other to absorb the shock of only one tire hitting at a time.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the Abstract of the Disclosure set forth above is intended to provide a nonlegal technical statement of the contents of the disclosure in compliance with the Rules of Practice of the U.S. Patent Office, and is not intended to limit the scope of the invention described and claimed herein.

What I claim is:

1. A device for use in a parking lot for engaging the wheels of a vehicle being parked, comprising: a plurality of body members interconnected by rod means for holding the body members in fixed spaced relation, each of said body members being substantially I-shaped in section and each having at least two longitudinally extending end flanges interconnected by a web intermediate the longitudinally extending edges of said flanges, each of said flanges having outwardly presenting face portions disposed at an angle to the plane of the lot; said web member being creased longitudinally intermediate the ends thereof connected to said flanges, said crease being closer to the plane of said lot than the connection between the flanges and said web; and said rod means comprising a plurality of rods extending between each of said body members and fixedly attached to the body members at the connections of said web and said flanges.